(No Model.)

J. SAURER.
REFRIGERATOR.

No. 309,496. Patented Dec. 16, 1884.

WITNESSES
Chas. H. Davis
F. T. Chapman

INVENTOR
John Saurer
By C. A. Alexander
Attorney

UNITED STATES PATENT OFFICE.

JOHN SAURER, OF ORRVILLE, OHIO.

REFRIGERATOR.

SPECIFICATION forming part of Letters Patent No. 309,496, dated December 16, 1884.

Application filed September 18, 1884. (No model.)

*To all whom it may concern:*

Be it known that I, JOHN SAURER, a citizen of the United States, residing at Orrville, in the county of Wayne and State of Ohio, have invented certain new and useful Improvements in Refrigerators, of which the following is a specification, reference being had therein to the accompanying drawings.

My invention relates to improvements in refrigerators, and is designed, objectively, to produce a refrigerating device for preserving meats or other perishable articles, in which a comparatively large space is had for wholesale purposes and the like, and a smaller space for retail purposes and for articles of small bulk. A further object is to produce a regulated circulation of air of low temperature, commonly designated "cold" air; also, to obviate all "dead" accumulations of comparatively "warm" air at any point; to arrange the ice chest or box so as to economize the ice to the greatest extent, and to so arrange that part of the device that is most often opened—viz., the portion containing the articles of small bulk—such as butter, fruits, and small meats—as to introduce the least possible amount of the exterior or warm air into the refrigerator, and so "raise" the temperature therein.

Figure 1:
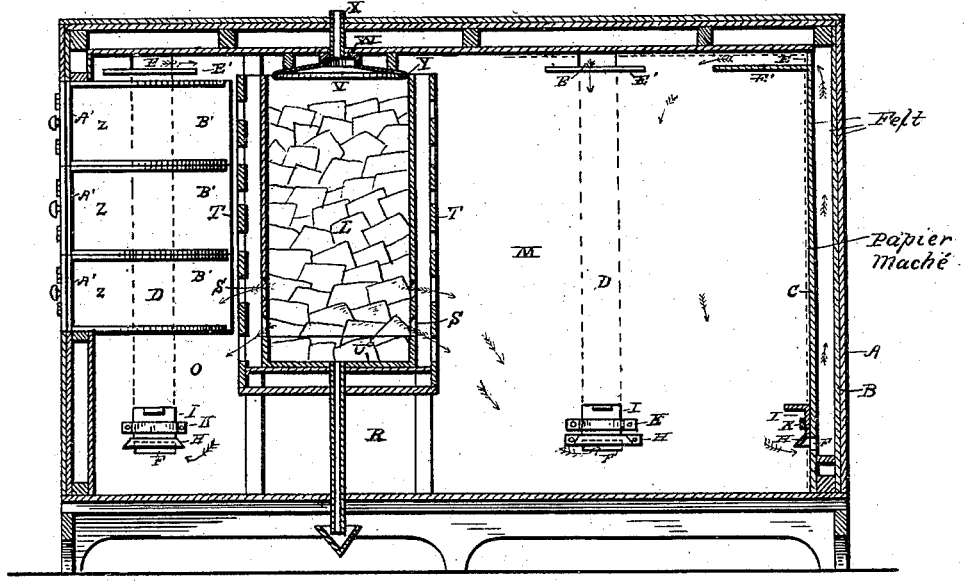
Figure 2:
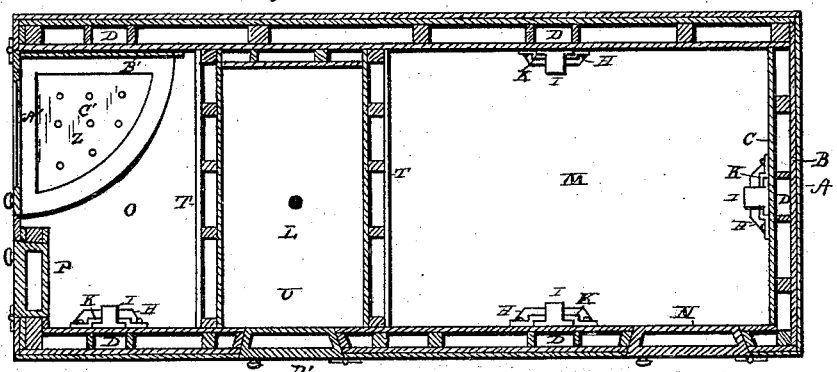
Figure 3:
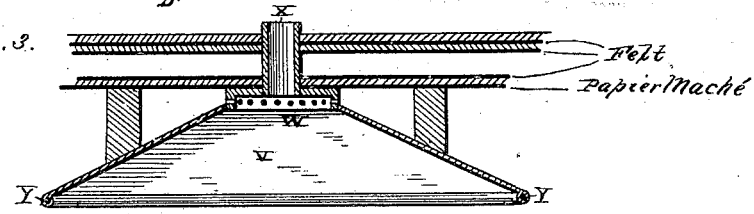

In describing the device and its operation reference is had to the annexed drawings, in which Figure 1 represents a longitudinal vertical section through the device; Fig. 2, a cross-section taken through Fig. 1, and Fig. 3 a detail section through the hood.

The walls consist, preferably, of an outer casing, A, a wall, B, between which and the said outer casing is a lining of felt, a framework of suitable construction, and an interior casing, C, between which and the wall B is the "dead-air" chamber, which forms one of the best and cheapest non-conductors of heat. The entire interior of the said dead-air chamber may be lined with felt, if desired. The casing C is constructed of any hard wood—such as maple or ash—it being the best for the purpose, as no moisture will collect on it, said moisture being one of the most common causes of meat and such articles putrefying or "spoiling." Within the said dead-air chamber, but having no connection with it, are several flues, D, opening into the interior of the refrigerator at the top, as shown at E, and near the bottom, as shown at F, where the opening is surrounded by a hood, H. A slide or valve, I, is arranged above the said hood and passes through a slot in the top thereof, whereby the opening F may be varied in size or entirely closed at pleasure. A bracket, K, retains the slide on the casing C. If so desired, the hood may be formed integral with the lower portion of the slide and move with it. An ice-chest, L, divides the refrigerator into a large or wholesale compartment, M, which is entered by a door, N, and a small or retail compartment, O, which may be entered by a door, P. The ice-chest is raised somewhat from the floor of the refrigerator and properly supported, leaving a passage, R, connecting the two chambers. The ice-chest has solid walls, the passages for the escape of cold air being at or very near the bottom, as shown at S. By this means the ice is kept from contact with the air from the two chambers or compartments, (the usual mode being to form the sides of the chest of slats,) and a better circulation established than would otherwise be possible from natural causes.

To prevent direct contact of the contents of the compartments and the ice-chest, a series of slats, T, are provided, and to catch the drippings from the ice a pan, U, preferably of papier-maché, with an escape-pipe of the same material, is placed within the said ice-chest. Over the ice-chest, within the refrigerator, and hung from or secured to the roof or ceiling thereof, is a hood, V, made, preferably, of papier-maché, with slanting sides and a central perforated extension, W, from which an air-escape pipe, X, (of papier-maché,) communicates with the exterior, or, in common terms, "with the outer air." The edges of the hood may be strengthened by a wire, Y, and approach the edges of the ice-chest, but do not quite touch them, for the purpose set forth hereinafter. In the compartment O are hinged shelves Z, arranged one above the other, so as to be normally contained therein, but moving independent one of the other. They consist each of an outer glass-paneled wall, A', flush with the outside of the refrigerator, a solid panel, B', at right angles to the other, and a perforated bottom, C', with a rounded edge forming the quarter of a circle. A handle is provided for convenience. When the shelf is swung around so as to be exterior to the chamber or compartment O, the rounded part is kept continually engaged with the edge of the wall, which arrangement, beside steadying the shelf in operation, gives the largest possible retaining-space. When entirely "opened," the panel B', which projects a little beyond the shelf C', completely closes the opening in the wall and prevents the introduction of warm air or the escape of cold air.

The use of several separate shelves instead of a connected series possesses a vital advantage in reducing to a minimum the possibility of any change in the condition of the air in the refrigerator, which change must occur to a greater or less extent when a door or similar device is opened or shut. The shelves are hinged at the angle, as shown. Ice having been introduced into ice-chamber through the door D', the cooled air will escape through the openings S and fall to the bottom, then passing into the openings F, being directed in a measure by the hoods, and up the flues, escaping at the openings E, and onto the spreaders E', which diffuse it over the chambers. The air having become somewhat heated in its passage is forced by the continued circulation of the colder air to the hood and through the perforations therein, and then downward through the ice, and again out the openings S. There will be more or less condensation on the hood, (except when papier-maché is used,) so the sides thereof do not quite touch the edges of the ice-chest, the water of condensation passing through the space and down the inside of the said sides of the chest. This is preferable to having it trickle down through the mass of ice, as the water would impart some of its heat to the said ice and melt it, while in passing down the sides of the ice-chest the ice is seldom touched thereby, as the said ice only comes in contact with the said sides at its edges, except in isolated instances. All the cold air does not pass up the flues, but is slowly diffused through the two chambers, and, in conjunction with the currents caused by the said flues, thoroughly cools the entire box, experiment having shown that the temperature can be maintained at but a few degrees above the freezing-point.

When papier-maché is used, instead of metal, for the hood, drip-pan, and other parts, the condensation or "sweat" thereon is completely obviated.

A refrigerator constructed of hard wood, and the parts usually constructed of metal being made of papier-maché or paper-pulp, will be completely dry within, no moisture, condensed, being discoverable, and therefore perishable articles will "keep" for an indefinite time.

To cheapen the construction, a soft-wood lining or casing, C, may be used with a papier-maché surface, which will absolutely prevent condensation on the walls of the refrigerator. Also, any scent from the said wood will not enter the chambers or compartments.

Having described my invention, what I claim is—

1. In a refrigerator provided with non-conducting walls, one or more flues contained within the said walls and communicating with the interior of the said refrigerator at the top and bottom, the upper opening being provided with a spreader or diffuser, substantially as and for the purpose specified.

2. In a refrigerator, one or more air-conducting flues communicating with the interior of the said refrigerator at top and bottom, the lower opening being provided with a valve or slide for regulating the size of the said opening, substantially as and for the purpose specified.

3. In a refrigerator, one or more air-conducting flues communicating with the interior thereof at top and bottom, the upper opening being provided with a spreader, and the lower opening with a hood and a regulating valve or slide.

4. In combination with the ice-chest of a refrigerator, a hood hung over the same, said hood having slanting sides and a perforated extension on top, substantially as and for the purpose set forth.

5. In combination with the ice-chest of a refrigerator, a hood hung over the same, said hood having slanting sides, the edges of which are strengthened and do not quite touch the walls of the ice-chest, and a perforated extension on top, said extension being provided with an escape-pipe.

6. The combination, in a refrigerator, with an ice-chest having solid walls and cold-air openings at or near the bottom thereof only, of a hood hung over the same, said hood having slanting sides and a perforated extension on top, from which projects an escape-pipe.

7. In a refrigerator, a series of coincident quadrantal shelves hinged at the angle and operating independently one of the other, each shelf having a panel that closes the space when the shelf or shelves are opened out.

8. In a refrigerator, a series of coincident quadrantal shelves hinged at the angle, each shelf having a glass-paneled front, a perforated bottom, and a solid back or panel at right angles to the front.

9. As an article of manufacture, a refrigerator with non-conducting walls, flues opening into the interior of the said refrigerator at the top, where a spreader is provided, and at the bottom, where a valve and hood are provided, an ice-box with openings at or near the bottom only, a hood over the same, said hood having slanting sides and a perforated top, and also having an escape-pipe and a series of coincident quadrantal shelves, with glass-paneled front, solid back, and perforated bottom, the said refrigerator being provided with doors, and arranged substantially as and for the purpose specified.

10. A refrigerator having an ice-chest, with a drip-pan, hood, and escape-pipes constructed of papier-maché or paper-pulp, to prevent condensation.

11. As an article of manufacture, a refrigerator having the interior of its walls lined with papier-maché or paper-pulp, to prevent condensation, substantially as and for the purpose specified.

12. As an article of manufacture, a refrigerator having the interior of its walls lined with papier-maché or paper-pulp, and an ice-chest with its drip-pan, hood, and escape-pipes made of the same material, substantially as and for the purpose specified.

13. In a refrigerator, the combination, with the ice-chest thereof, of a drip-pan constructed of papier-maché or paper-pulp, substantially as and for the purpose specified.

14. In a refrigerator, the combination, with the ice-chest, of a hood for the same, constructed of papier-maché or paper-pulp, substantially as and for the purpose specified.

In testimony whereof I affix my signature in presence of two witnesses.

JOHN SAURER.

Witnesses:
H. M. WILSON,
C. D. SWAN.